(12) United States Patent
Wilhelm et al.

(10) Patent No.: US 7,153,927 B2
(45) Date of Patent: Dec. 26, 2006

(54) PROCESS OF CONTINUOUSLY PRODUCING POLYESTERS OR COPOLYESTERS

(75) Inventors: Fritz Wilhelm, Karben (DE); Michael Reisen, Frankfurt am Main (DE)

(73) Assignee: Zimmer AG, Frankfurt Main (DE)

( * ) Notice: Subject to any disclaimer, the term of this patent is extended or adjusted under 35 U.S.C. 154(b) by 329 days.

(21) Appl. No.: 10/451,292

(22) PCT Filed: Nov. 27, 2001

(86) PCT No.: PCT/EP01/13776

§ 371 (c)(1),
(2), (4) Date: Feb. 5, 2004

(87) PCT Pub. No.: WO02/50159

PCT Pub. Date: Jun. 27, 2002

(65) Prior Publication Data

US 2004/0106746 A1      Jun. 3, 2004

(30) Foreign Application Priority Data

Dec. 21, 2000 (DE) .............................. 100 64 361
Jun. 2, 2001  (DE) .............................. 101 27 147

(51) Int. Cl.
     *C08G 63/00*      (2006.01)
(52) U.S. Cl. ............................ 528/308.5; 528/308.3; 528/308.8; 528/309.1
(58) Field of Classification Search .................... None
     See application file for complete search history.

(56) References Cited

U.S. PATENT DOCUMENTS

| 3,819,585 | A | * | 6/1974 | Funk et al. ................. 528/305 |
| 4,077,945 | A | * | 3/1978 | Heinze et al. ............ 528/308.4 |
| 4,670,580 | A |   | 6/1987 | Naurer ....................... 560/89 |
| 4,758,650 | A |   | 7/1988 | Schulz Van Endert ... 528/308.3 |
| 5,270,444 | A | * | 12/1993 | Shiraki et al. ............. 528/499 |
| 5,466,776 | A |   | 11/1995 | Krautstrunk et al. .......... 526/68 |
| 5,753,190 | A | * | 5/1998 | Haseltine et al. ........... 422/131 |
| 2001/0029289 | A1 |   | 10/2001 | Kelsey et al. |

FOREIGN PATENT DOCUMENTS

EP          0 244 546 B1       3/1989

OTHER PUBLICATIONS

Abstract, Database WPI, Week 199729, Derwent Publications Ltd., London, GB; AN 1997-316631 XP002195467 & JP 09 124783 A (Toray Ind Inc), May 13, 1997.

* cited by examiner

*Primary Examiner*—Michael J. Feely
(74) *Attorney, Agent, or Firm*—Norris McLaughlin & Marcus PA

(57) ABSTRACT

Process for producing polyesters and copolyesters, wherein a continuous esterification of dicarboxylic esters and diols or a continuous transesterification of dicarboxylic esters with diols is effected in "n" reaction pressure stages connected in series, the pressure in the first reaction pressure stage is higher than that of the remaining reaction pressure stages, and successively decreases from reaction pressure stage to succeeding reaction pressure stage, the combined vapor flows of the individual reaction pressure stages are rectified in a rectifying column, and the diol component obtained at the bottom of the rectifying column is recirculated at least to the first reaction pressure stage, and wherein at least the last reaction pressure stage operates at a vacuum, the pressure in the rectifying column is greater than that of the last reaction pressure stage, and the vapors discharged from the last reaction pressure stage are condensed to the pressure existing in the rectifying column.

12 Claims, 3 Drawing Sheets

PROCESS OF CONTINUOUSLY PRODUCING POLYESTERS OR COPOLYESTERS

This is a 371 of PCT/EP01/13776 filed 27 Nov. 2001 (International filing date).

This invention relates to a process of producing polyesters or copolyesters by continuous esterification of dicarboxylic esters and diols or by continuous transesterification of dicarboxylic esters with diols in n reaction pressure stages connected in series, wherein the pressure existing in the first reaction pressure stage, which is higher as compared to the other reaction pressure stages, successively decreases from reaction pressure stage to reaction pressure stage, the combined vapor flows of the individual reaction pressure stages are introduced into a rectifying column and rectified, and the diol component obtained at the bottom of the rectifying column is recirculated at least to the first reaction pressure stage.

BACKGROUND OF THE INVENTION

It is known that the continuous production of polyethylene terephthalate (PET) from terephthalic acid (TPA) and ethane diol (EG) is effected by esterification in a first reaction stage under an elevated pressure and in a further reaction stage under normal pressure. To further oligomerize the esterification products, there are subsequently provided two prepolycondensation stages operating under a vacuum and a final reactor for producing the finished polyester melt in a fine vacuum.

For performing such 5-stage process, EP-B-0 244 546 describes apparatuses for vapor condensation and vacuum generation by means of multistage steam jet pumps each including a preceding spray condenser and succeeding direct-contact condensers. The steam jet pumps are operated with purified process water vapor from the rectifying column above the first reaction pressure stage, which process water vapor has an excess pressure of 2 to 3 bar, a recirculation of cooling water being effected from the direct-contact condensers towards the rectifying column. The disadvantages of this process substantially consist in a high organic contamination of the waste water in open process circuits and in a large and cost-intensive amount of apparatus on the whole, as each reaction stage, also the second reaction stage of the esterification, has a separate condensation system. Moreover, the formation of diethylene glycol (DEG) is increased as a result of the elevated pressure in the first reaction pressure stage and at the bottom of the rectifying column.

In general it should be noted that when rectifying the original superheated vapor stream with a weight content of about 50% EG in the rectifying column, a considerable part of the steam gets lost both materially and energetically as operating steam for operating steam jet pumps.

An improvement of the above-described process is achieved in that the vapors of the first and second reaction pressure stages of the esterification are supplied together to a rectifying column, and two vacuum stages are combined in a single prepolycondensation stage.

The disadvantage of a single prepolycondensation stage, however, is a size-related limitation of the capacity as a result of an increased generation of gas and the increasing risk of an entrainment of droplets as well as a generally undesired increase of the content of carboxylic groups in the polyester or copolyester as a result of a faster evaporation of EG during the prepolycondensation without pressure differentiation.

The subject-matter of U.S. Pat. No. 4,670,580 is a 4-stage total process of producing PET, wherein in the second reaction stage an esterification under a vacuum is provided, and wherein a typical acid conversion of 97% is effected. This conversion appears to be too low for a lasting gas relief in the pre-polycondensation stage, i.e. an increased conversion requires longer dwell times, i.e. larger and more expensive reaction apparatuses. In any case, an additional rectifying column with recirculation of EG or some other, separate condensation system with subsequent recovery of EG is necessary.

In the esterification under a vacuum in the second reaction stage, there are also considerable reservations as regards the quality and flexibility of the plant with respect to the addition of additives; as without normal pressure and without stirring the melt, in particular in the textile PET production, admixing additives free from agglomerate and without evaporation losses is quite difficult.

It is the object of the present invention to improve the above-described process such that the amount of apparatus required and the operating costs for cooling water and for energy are decreased without impairing the quality of the polyesters or copolyesters produced and the flexibility of the process.

SUMMARY OF THE INVENTION

This object is solved in that proceeding from the above-described process at least the last reaction pressure stage is operated at subatmospheric pressure of 100 to 900 mbar (absolute), the pressure in the rectifying column is larger than in the last reaction pressure stage, and the vapors discharged from the last reaction pressure stage are condensed to the pressure existing in the rectifying column.

DETAILED DESCRIPTION

The various processes for esterification or transesterification are performed in n reaction pressure stages connected in series, the pressure decreasing successively with increasing monomer conversions or advancing sequence of reaction pressure stages.

In the esterification process for producing polybutylene terepththalate (PBT), the reaction pressure stages are exclusively operated under a vacuum, whereas in the esterification process for producing PET and polytrimethyl terephthalate (PTT) the first reaction pressure stage is operated under an excess pressure and the last reaction pressure stage is operated under a vacuum. In the transesterification process, proceeding from dimethyl terephthalate (DMT) and 1,4-butanediol (BDO), the first reaction pressure stage is substantially operated under normal pressure.

For the technical effect of the inventive process it is irrelevant whether the individual reaction pressure stages are disposed in a single apparatus or constitute separate reactors.

For performing the inventive process, at least two reaction pressure stages are required. For a particularly advantageous procedure it is expedient to utilize three reaction pressure stages. The application of a process with four reaction pressure stages likewise is possible, wherein the vapors of the last reaction pressure stage are condensed to the pressure of the penultimate reaction pressure stage or the pressure of the rectifying column.

A condensation of the vapors of the last reaction pressure stage and a correspondingly larger rectifying column are avoided by condensing the vapors to a comparatively higher pressure. For the case that the process is performed by using two reaction pressure stages, the height of the pressure in the rectifying column lies between the pressure in the first reaction pressure stage and that of the second reaction pressure stage. When using more than two reaction pressure stages, the pressure in the rectifying column is not larger than the pressure existing in the penultimate reaction pressure stage.

The condensation of the vapors is effected by means of a compressor, blower or ventilator. However, it is particularly advantageous to perform the condensation of the vapors by means of a gas jet pump by using superheated vapors from the first reaction pressure stage as operating steam, since vapors of the first reaction pressure stage are available at no cost in a sufficient quantity and thus the condensation of vapors by using compressors, blowers or ventilators is only considered in the second place.

A particular aspect of the inventive process should be seen in that the pressure existing in the rectifying column can be controlled by an exhaustion of residual gas, which is effected behind the condenser mounted at the head of the rectifying column, for instance by means of a liquid jet pump, a liquid ring pump or also by means of a blower.

Especially in PET esterification, a further aspect of the inventive process is the pressure control in the vacuum esterification stage under partial load in consideration of a pressure decreasing with smaller flow rate, for instance from about 1750 mbar at 100% flow rate to about 1250 mbar at 50% flow rate, with constant filling level in the first reaction pressure stage and a still low formation of DEG. As a result of the reduced operating steam pressure at the gas jet pump under partial load, the pressure of the vacuum stage is increased from about 500 mbar under full load to about 800 mbar with 50% flow rate, each with constant counter-pressure of about 1000 mbar at the rectifying column.

For quality reasons, however, a constant vacuum in the vacuum esterification stage is required, independent of the flow rate.

In accordance with the invention, this constancy of the pressure is achieved without larger dimensions of the rectifying column with a controlled decrease of the pressure in the rectifying column to 640 to 700 mbar at a flow rate of 50%.

The corresponding for vacuum of the rectifying column is generated and controlled via an air exhauster disposed behind the column head condenser, alternatively via a liquid jet pump or a liquid ring pump.

For continuously producing PET esterification product, there can preferably be used a three-stage process with the parameters indicated in Table 1 by way of example.

TABLE 1

|  |  | Stages No. | | |
|---|---|---|---|---|
|  |  | I | II | III |
| Temperature | (° C.) | 243–269° | 255–270° | 262–272° |
| Pressure | (bar) | 1.2–2.5 | 1.0–1.1 | 0.3–0.6 |
| Dwell time | (min) | 120'–450' | 35'–110' | 45'–130' |

To the first reaction pressure stage (I) operated under excess pressure, EG and TPA are simultaneously introduced as paste in a molar ratio <2, preferably ≦1.2, whereby TPA conversions of 88 to 93% are achieved. The second reaction pressure stage (II) is operated under normal pressure, and a conversion of 94 to 97.4%, preferably 95.5 to 96.7% is achieved. The reaction pressure stage (II) is used for admixing additives and for adjusting the molar EG content in the end product. In the third reaction stage (III) operated under a vacuum, the conversion is increased to >97 to 99%, preferably to 97.9 to 98.5%.

By means of a gas jet pump, the vapors from the third reaction pressure stage (III) are condensed to the pressure of the rectifying column. The operating steam is withdrawn from the vapors of the first reaction pressure stage (I). Under nominal load, the pressure of the vapors is increased by a factor of 1.6 to 2.6 during the condensation of the vapors from the last stage.

The continuous production of PTT esterification product is expediently effected by means of a two-stage process with the parameters indicated in Table 2 by way of example, using a paste prepared from 1,3-propanediol (PDO) and TPA in a molar ratio of 1.15 to 2.20, preferably ≦1.40.

TABLE 2

|  |  | Stage | |
|---|---|---|---|
|  |  | I | II |
| Introduced molar ratio PDO/TPA |  | 1.15–2.20 | — |
| Temperature | (° C.) | 243–263 | 242–262 |
| Pressure | (bar) | 1.0–3.5 | 0.7–1.1 |
| Dwell time | (min) | 140–360 | 30–80 |

When producing PBT transesterification product by means of a two-stage process, butanediol (BDO) and liquid DMT are separately introduced into the first reaction pressure stage with a molar ratio of 1.2 to 1.4. The process parameters are indicated in Table 3 by way of example.

TABLE 3

|  |  | Stage | |
|---|---|---|---|
|  |  | I | II |
| Introduced molar ratio BDO/DMT |  | 1.15–1.50 | — |
| Temperature | (° C.) | 165–185 | 195–210 |
| Pressure | (bar) | 0.90–1.20 | 0.4–0.7 |
| Dwell time | (min) | 70–180 | 40–90 |

The inventive process is schematically represented in the drawing and will subsequently be explained in detail by way of example. In the drawing

BRIEF DESCRIPTION OF THE DRAWINGS

As shown in FIG. 1, a prefabricated diol/dicarboxylic acid paste is introduced into the first reactor (2) via line (1). The product stream discharged from the first reactor (2) via line (3) is supplied to the second reactor (4). Via line (5), the finished esterification product is discharged from the second reactor (4). The vapors discharged from the first reactor (2), minus a small bypass stream conducted via line (7) and provided for pressure regulation in the first reaction stage, are supplied to a heated gas jet pump (8) via line (6), by means of which gas jet pump the gas stream introduced via line (9), which is composed of the vapors of the second reactor (4) discharged via line (10) and a ballast stream to be used for controlling the pressure in the second reactor (4) and flowing through line (11), is condensed to the pressure of the rectifying column (12). The vapors discharged from the first reactor via line (6) and the vapors discharged from the second reactor via lines (10, 9) are charged into the gas jet pump (8). In line (14), the vapor stream discharged from the gas jet pump (8) via line (13) is combined with the vapor bypass stream supplied via line (7) and charged into the inlet of the rectifying column (12), in which the low-boiling components are separated from the high-boiling diol component. The low-boiling components discharged at the head of the rectifying column (12) via line (15) are condensed in the condenser (16). The condensate flowing off via line (17) is divided into a reflux stream and a product stream via the reflux tank (18). The reflux stream is supplied to the head of the rectifying column (12) via line (19), and the product stream is withdrawn via line (20). The diol enriched at the bottom of the rectifying column (12) is for the most part supplied to the first reactor (2) via lines (21, 22), and only a small part branched off via line (23) is supplied to the second reactor (4). It is possible to feed additives and/or comonomers into the second reactor (4) via line (24). In addition, an aliquot of the diol flowing through line (22) can be branched off via line (22a) and be used for preparing the paste.

Figure 1:
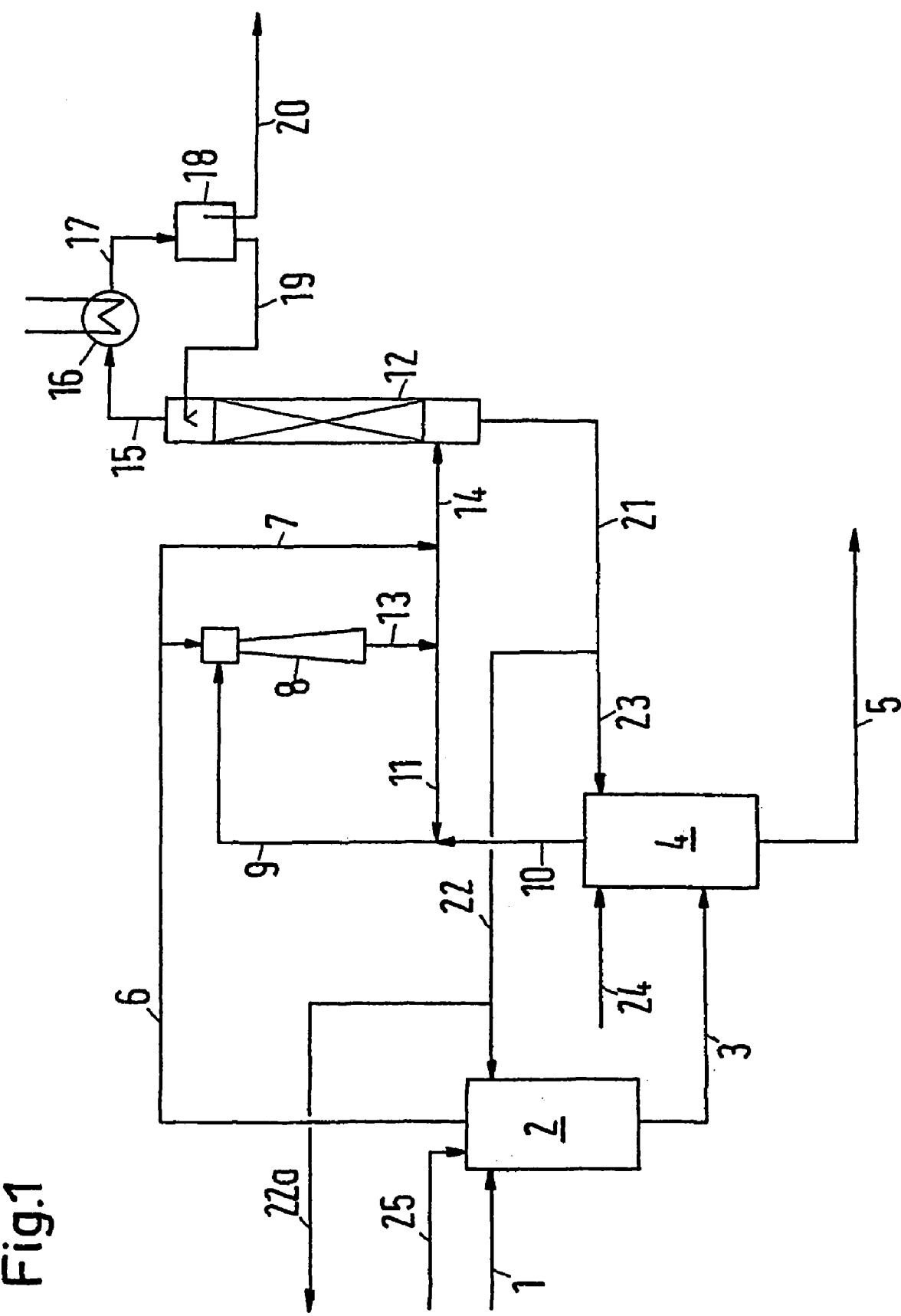
FIG. 1 shows a process diagram for producing esterification/transesterification products by means of two reaction pressure stages for PPT and PBT.

For the case that the process diagram represented in FIG. 1 is used for the purpose of transesterification, diol is fed into the first reactor (2) via line (1) and DMT is fed into the first reactor (2) via line (25).

Figure 2:
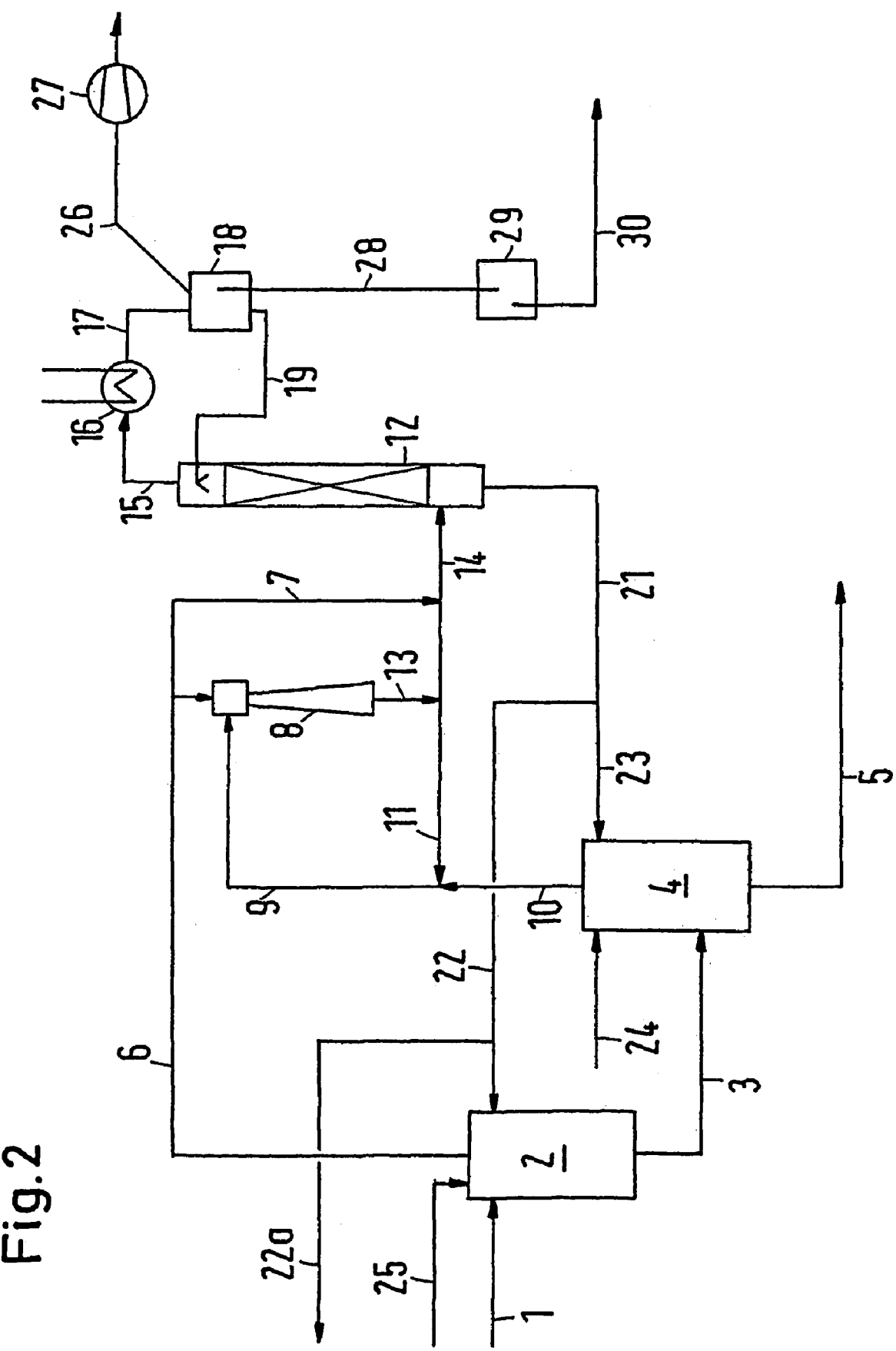
FIG. 2 shows an aspect of the process diagram in accordance with FIG. 1.

To be able to operate the process diagram represented in FIG. 1 also under a vacuum, it is provided in accordance with FIG. 2 to effect a residual gas compression behind the condenser (16) by means of a pump (27) exhausting the residual gas from the reflux tank (18) via line (26). The condensate flowing out of the reflux tank (18) via line (28) is brought to normal pressure by means of a dipping tank (29), and the condensate is then removed from the process via line (30).

Figure 3:
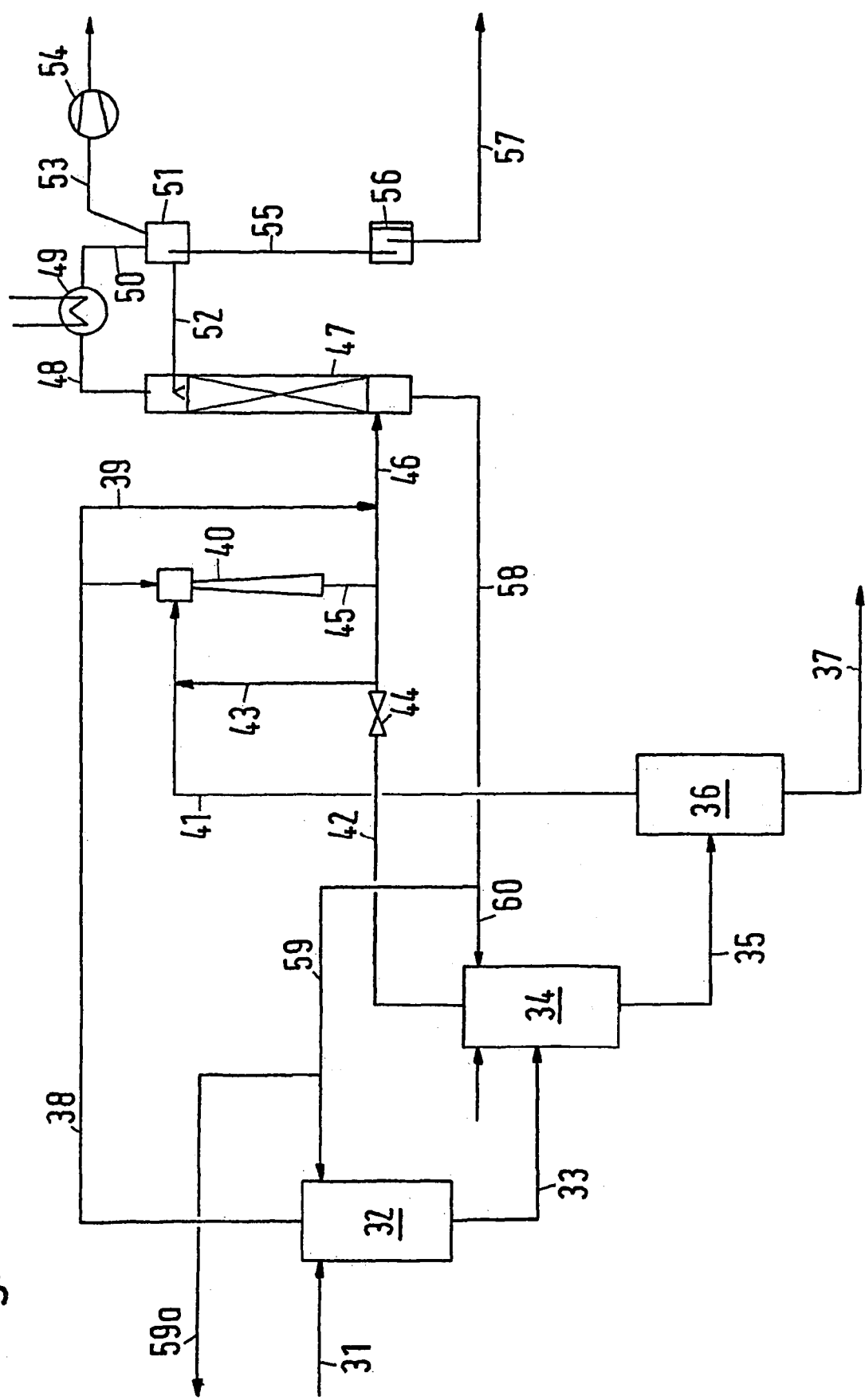
FIG. 3 shows a process diagram for producing PET esterification product by means of three reaction stages.

In the process diagram as shown in FIG. 3, EG/TPA paste is introduced into the first reactor (32) via line (31), the outlet of said reactor being fed into the second reactor (34) via line (33). The product stream leaving the second reactor (34) via line (35) is supplied to the third reactor (36), from which the finished esterification product is discharged via line (37). Via line (38), the vapors discharged from the first reactor (32), minus a small bypass stream flowing through line (39) and used for pressure control in the first reaction stage (32), are supplied to the heated gas jet pump (40). Via line (43), an amount of ballast stream from the vapors of the second reactor (34) flowing through line (42) is added to the vapors discharged from the third reactor (36) via line (41), in order to condense the vapors of the third reactor (36) to the pressure of the rectifying column by means of the gas jet pump (40). If necessary, the vapors discharged from the second reactor (34) via line (42) are combined with the vapors discharged from the gas jet pump (40) via line (45) and with the bypass stream supplied via line (39), upon flowing through the pressure maintaining valve (44), so that the pressure of the second reactor (34) is larger than or equal to the pressure in the rectifying column. Via line (46), the combined vapors are fed into the rectifying column (47), where the low-boiling components are separated from the high-boiling diol component. The low-boiling components discharged at the head of the rectifying column (47) via line (48) are condensed in the condenser (49). Via line (50), the condensate flows into the reflux tank (51), from which part is again charged into the head of the rectifying column (47) via line (52). For vacuum operation of the rectifying column (47) under partial load, the reflux tank (51) is connected with a suction pump (54) via line (53). The condensate discharged from the reflux tank (51) via line (55) is brought to normal pressure in the dipping tank (56) and removed via line (57) for further processing. The ethane diol containing a small amount of high-boiling components at the bottom of the rectifying column (47) is recirculated for the larger part to the first reactor (32) via lines (58, 59) and for the smaller part to the second reactor (34) via line (60). From the diol flowing through line (59) an aliquot can be branched off via line (59a) and be used for preparing the paste.

We claim:

1. A process of producing polyesters and copolyesters by continuous esterification of dicarboxylic esters and diols or by continuous transesterification of dicarboxylic esters with diols in n reaction pressure stages, where n=at least 2, connected in series, wherein the pressure in the first reaction pressure stage is higher than the pressure of the remaining reaction pressure stages, and the pressure successively decreases from reaction pressure stage to reaction pressure stage, the combined vapor flows of the individual reaction pressure stages are introduced into a rectifying column and rectified, and the diol component obtained at the bottom of the rectifying column is recirculated at least to the first reaction pressure stage, at least the last reaction pressure stage in the series has a vacuum, the pressure in the rectifying column is greater than that in the last reaction pressure stage, and vapors discharged from the last reaction pressure stage are condensed to the pressure existing in the rectifying column.

2. The process as claimed in claim 1, wherein said reaction pressure stages are 2 to 4 reaction pressure stages connected in series.

3. The process as claimed in claim 1, wherein, for producing a polyethylene terephthalate (PET) esterification product, n=3, a feed mixture is supplied to the first reaction pressure stage, which is operated at a pressure of 1.1 to 5.0 bar, and is followed by the second reaction pressure stage, operated at a pressure of 0.5 to 1.5 bar which is then followed by the third reaction pressure stage operated at a vacuum of 0.1 to 0.9 bar.

4. The process as claimed claim 1, wherein, for producing PTT esterification product, n=2, a feed mixture is supplied to the first reaction pressure stage which is operated at a pressure of 1.0 to 5.0 bar, and is followed by a second reaction pressure stage, which is operated at a pressure of 0.5 to 1.3 bar.

5. The process as claimed in claim 1, wherein n=2 and, for producing PBT transesterification product, starting substances are supplied to the first reaction pressure stage operated at a pressure of 0.8 to 1.2 bar, which is followed by the second reaction pressure stage operated at a pressure of 0.2 to 0.8 bar.

6. The process as claimed in claim 1, wherein vapors discharged from the last reaction pressure stage are condensed by means of a compressor, blower or ventilator.

7. The process as claimed in claim 1, wherein vapors discharged from the last reaction pressure stage are condensed by means of a gas jet pump.

8. The process as claimed in claim 7, wherein vapors of the first reaction pressure stage are used as operating fluid for the gas jet pump.

9. The process as claimed in claim 1, wherein a condenser is disposed at the head of the rectifying column, and the pressure existing in the rectifying column is controlled by a residual gas exhaustion provided behind said condenser.

10. The process as claimed in claim 9, wherein the residual gas exhaustion is performed by means of a liquid jet pump, a liquid ring pump or a blower.

11. The process as claimed in claim 1, wherein the esterification products or transesterification products are subjected to a prepolycondensation and polycondensation.

12. The process as claimed in claim 1, wherein an aliquot of the diol recirculated to the first reaction pressure stage is branched off and used for preparing a diol/dicarboxylic acid paste, which is introduced into the first reaction pressure stage.

* * * * *